United States Patent Office 2,755,170
Patented July 17, 1956

2,755,170

CORROSION INHIBITOR

Edward M. Stubblefield, Evansville, and Walter V. Cropper, Munster, Ind., assignors to Servel, Inc., New York, N. Y., a corporation of Delaware No Drawing. Application May 29, 1953,
Serial No. 358,546

7 Claims. (Cl. 23—89)

The present invention relates to a method of inhibiting the corrosion and formation of hydrogen in apparatus having parts made of iron, including its alloys called steel, and containing a water solution of halide salt and the group of cooperating substances used in the apparatus.

Heat operated vacuum type absorption refrigeration units having iron and steel parts and containing a water solution of halide salt have been used extensively for air conditioning. Such a refrigeration unit is illustrated and described in United States Letters Patent to C. A. Roswell Re. 23,093 reissued March 22, 1949 and entitled Refrigeration. Hydrogen is generated in such apparatus as a result of corrosion and a small amount of the hydrogen accumulating in said apparatus has a large volume, due to the low operating pressure, which interferes with the proper operation of the apparatus. The presence of hydrogen in the apparatus is a nuisance and a purging device is illustrated in said patent to continuously transfer the non-condensable gases from an active to an inactive part of the system where they are segregated. Inhibitors also have been used to decrease the rate of corrosion and hydrogen generation which are quite effective at temperatures below 100° C. It is now proposed to use a similar apparatus for heating as well as cooling which has iron and steel parts and contains a water solution of halide salt but operates at temperatures above 100° C. It has been found, however, that the inhibitors previously used are not as effective in such apparatus when operating at temperatures above 100° C. and that the rate of hydrogen generation approximately doubles for each 10° C. increase in temperature above 100° C.

The object of the present invention is to provide an improved method of and new group of cooperating substances for inhibiting corrosion in apparatus having iron and steel parts and containing a water solution of a halide salt.

The method of the present invention in its broadest aspect comprises the step of adding a small amount of molybdate to a water solution of halide salt selected from a group consisting of lithium chloride and lithium bromide when used in apparatus having iron or steel parts. Preferably, the method includes the step of adjusting the alkalinity of the water solution of lithium bromide or lithium chloride to at least .0316 normal in alkali corresponding to pH 12.5 if completely ionized and adding a small amount of molybdate. The alkalinity of the solution may be adjusted between 0.0316 normal in alkali corresponding to pH 12.5 if completely ionized and 0.316 normal in alkali corresponding to pH 13.5 if completely ionized. Still more specifically, the present invention comprises a group of cooperating substances for use in a heating and cooling apparatus having iron or steel parts comprising a water solution of lithium bromide or lithium chloride as a refrigerant-absorbent combination and small amounts of a hydroxyl and molybdate.

It has been discovered that when molybdate is added to water solutions of lithium bromide or lithium chloride, a protective film is formed on the surface of iron and steel parts contacted by the solution which inhibits corrosion and appears to consist of an oxide of the metal. Experiments show that both sodium molybdate and lithium molybdate are equally effective in inhibiting corrosion and the rate of hydrogen generation caused by the contact of water solutions of lithium halide salts selected from a group consisting of lithium bromide, lithium chloride or a mixture thereof with iron or steel surfaces. Lithium molybdate is preferred as an inhibitor because of the identity of their common component, lithium. It has been determined by experiment that an initial charge of 150 milligrams of lithium molybdate for each square foot of iron or steel surface when added to a water solution of lithium bromide is sufficient to inhibit corrosion. However, the molybdate is consumed or used up in forming a protective film on the iron or steel surfaces so that a much larger amount of molybdate should be supplied to repair any breaks that may occur in the film. Therefore, the apparatus is initially charged with a water solution of lithium bromide or lithium chloride and containing from at least 150 milligrams of lithium molybdate for each square foot of iron or steel surface, constituting the smallest quantity found to produce a satisfactory film, to an amount of lithium molybdate to saturate the particular salt solution. In order to provide a reserve supply of molybdate sufficient to last for the life of the apparatus, additional amounts of molybdate over that required to produce a saturated solution are preferably used up to, for example, two grams per square foot of iron or steel surface. Such additional molybdate over that required to produce a saturated solution may be precipitated on some relatively cold surface specially designed so that the precipitate will not interfere with fluid flow or heat transfer in the apparatus. The reserve supply of lithium molybdate over that constituting a saturated solution will then replace the molybdate leaving the solution to form a protective film. While molybdate is not as effective an inhibitor of water solutions of lithium halide solutions at temperatures below 100° C. as inhibitors previously used, it constitutes a satisfactory inhibitor at such temperatures and is more effective than the previously used inhibitors at temperatures above 100° C.

It is desirable to adjust the alkalinity of the lithium bromide or lithium chloride solution to as near tenth normal as possible corresponding to pH 13 if completely ionized. Experiments indicate that the protective film is formed on the iron or steel parts more effectively in solutions having a pH between 12.5 and 13.5. The alkalinity of the solution may be adjusted by adding any suitable hydroxide. It has been found that sodium hydroxide and lithium hydroxide are equally effective in adjusting the alkalinity but lithium hydroxide is preferred because of the common component, lithium. For example, in a solution containing 65% by weight of lithium bromide, .029% by weight of the hydroxyl of any suitable hydroxide corresponding to an alkalinity of pH 12.5 if completely ionized is a preferred lower limit of alkalinity while .44% by weight of hydroxyl constitutes the upper limit in a 35% solution of lithium chloride, corresponding to pH 13.5 if completely ionized. When lithium hydroxide is used to adjust the alkalinity of solutions between 35% and 65% by weight of lithium bromide or 35% to 45% by weight of lithium chloride, the amount of lithium hydroxide may vary between a minimum of .041% by weight of a 65% lithium bromide solution when adjusted to .0316 normal in alkali and a maximum of .62% by weight of a 35% lithium chloride solution when adjusted to .316 normal in alkali. When sodium hydroxide is used to adjust the alkalinity, the amount varies between .069 by weight of a 65% lithium bromide solution adjusted to .0316 normal in alkali and 1.04% by weight of a 35% lithium chloride solution adjusted to .316 normal in alkali.

Thus, the invention also resides in a group of cooperating substances for use in heating and cooling apparatus having iron or steel parts and comprising a water solution of lithium bromide or lithium chloride or a mixture of lithium bromide and lithium chloride and small amounts of hydroxyl and molybdate. The concentration of the cooperating substances may vary from 35% to 65% by weight of lithium bromide or 35% to 45% by weight of lithium chloride, .029% to .44% by weight of hydroxyl of a suitable hydroxide such as lithium hydroxide and sodium hydroxide, from 150 milligrams to 2 grams of a molybdate selected from a group consisting of lithium molybdate and sodium molybdate for each square foot of iron or steel surface and the remainder water. A preferred quantity of lithium molybdate to be used in a water solution of lithium bromide contacting iron or steel surfaces is 1 gram for each square foot of such surface. For example, 100 grams of lithium molybdate is added to a 50% water solution of lithium bromide used in an hermetically sealed heating and cooling apparatus generally similar to that illustrated in the United States Letters Patent to T. K. Sherwood No. 2,557,573 issued June 19, 1951, entitled Air Conditioning and having an internal area of approximately 100 square feet. This group of cooperating substances including lithium molybdate in a water solution of lithium bromide satisfactorily inhibits corrosion of iron or steel surfaces when operating at temperatures below 100° C. and materially reduces corrosion and the generation of hydrogen gas in apparatus incorporating metal parts of both iron and copper over known inhibitors and inhibitors previously used when operating at temperatures above 100° C.

It will now be observed that the present invention provides a method of and group of cooperating substances for inhibiting corrosion and the formation of hydrogen in a closed vacuum type apparatus having iron or steel parts and containing a water solution of lithium bromide or lithium chloride. It will also be observed that the present invention provides for adjusting the alkalinity of the solution to at least .0316 normal in alkali and preferably .1 normal in alkali.

While the method and group of cooperating substances for inhibiting corrosion and the formation of hydrogen is described in detail, it will be understood that the steps of the method may be varied and the proportion of the parts of the solution may be changed without departing from the spirit or scope of the invention. Reference therefore should be had to the appended claims for a definition of the limits of the invention. The word iron as used in the claims means any metal in the group consisting of iron and steel.

What is claimed is:

1. In apparatus having iron parts and containing a water solution of halide salt selected from a group consisting of lithium chloride and lithium bromide, the method of inhibiting corrosion and the formation of hydrogen in the apparatus which comprises adding at least 150 milligrams of lithium molybdate to the solution for each square foot of iron surface.

2. In apparatus having iron parts and containing a water solution of halide salt selected from a group consisting of lithium chloride and lithium bromide, the method of inhibiting corrosion and the formation of hydrogen in the apparatus which comprises the steps of adjusting the alkalinity of the solution to at least .0316 normal in alkali and adding lithium molybdate to the solution in quantity ranging from 150 milligrams for each square foot of iron surface to that required to saturate the solution.

3. In apparatus having iron parts and containing a water solution of lithium bromide, the method of inhibiting corrosion and the formation of hydrogen in the apparatus which comprises the steps of adjusting the alkalinity of the lithium bromide solution to at least .0316 normal in alkali by adding lithium hydroxide and adding lithium molybdate in quantity greater than that required to saturate the solution.

4. A group of cooperating substances for use in apparatus having iron parts consisting of from 35% to 65% by weight of halide salt selected from a group consisting of lithium chloride and lithium bromide, at least 150 milligrams of an alkali metal molybdate for each square foot of iron surface and the remainder water.

5. A group of cooperating substances for use in apparatus having iron parts consisting of from 35% to 65% by weight of halide salt selected from a group consisting of lithium chloride and lithium bromide, from 150 milligrams to 2 grams of a molybdate selected from a group consisting of sodium molybdate and lithium molybdate for each square foot of iron surface and the remainder water.

6. A group of cooperating substances for use in apparatus having iron parts consisting of from 35% to 65% by weight of halide salt selected from a group consisting of lithium chloride and lithium bromide, from .0417% to 1.047% by weight of a hydroxide selected from the group consisting of sodium hydroxide and lithium hydroxide, from 150 milligrams to 2 grams of a molybdate selected from a group consisting of sodium molybdate and lithium molybdate for each square foot of iron surface, and the remainder water.

7. A group of cooperating substances for use in apparatus having iron parts consisting of from 35% to 65% by weight of halide salt selected from a group consisting of lithium chloride and lithium bromide, from .041% to .62% by weight of lithium hydroxide, from 150 milligrams to 2 grams of lithium molybdate for each square foot of iron surface, and the remainder water.

References Cited in the file of this patent

UNITED STATES PATENTS

| Number | Name | Date |
|---|---|---|
| 2,319,668 | Edmunds | May 8, 1943 |
| 2,448,462 | Renzoni | Aug. 31, 1948 |
| 2,460,974 | Carosella | Feb. 8, 1949 |